US007231188B2

(12) United States Patent
Godston et al.

(10) Patent No.: US 7,231,188 B2
(45) Date of Patent: *Jun. 12, 2007

(54) SELF OPERATING OPENING MECHANISM FOR USE IN A HAND-HELD ELECTRONIC DEVICE

(75) Inventors: Jon Godston, Cusago (IT); Karstem Aagaard, St. Charles, IL (US); Brian Hassemer, Gumee, IL (US); Fabio Moneta, Oderzo (IT)

(73) Assignee: Motorola, Inc., Schaumburg, IL (US)

( * ) Notice: Subject to any disclaimer, the term of this patent is extended or adjusted under 35 U.S.C. 154(b) by 376 days.

This patent is subject to a terminal disclaimer.

(21) Appl. No.: 10/619,808

(22) Filed: Jul. 15, 2003

(65) Prior Publication Data

US 2004/0018862 A1 Jan. 29, 2004

(30) Foreign Application Priority Data

Jul. 22, 2002 (EP) .................................. 02425474

(51) Int. Cl.
*H04M 1/00* (2006.01)
*H04B 1/38* (2006.01)

(52) U.S. Cl. .................... 455/73; 455/575.1; 455/90.3; 379/433.13

(58) Field of Classification Search ............. 455/575.1, 455/575.3, 90.3, 347–349; 379/433.13
See application file for complete search history.

(56) References Cited

U.S. PATENT DOCUMENTS

| 2,516,935 A | 8/1950 | Weaver et al. |
| 4,484,029 A | 11/1984 | Kenney |
| 4,725,157 A | 2/1988 | Nakai et al. |
| 5,485,517 A * | 1/1996 | Gray ..................... 379/433.13 |
| 5,504,812 A | 4/1996 | Vangarde |

(Continued)

FOREIGN PATENT DOCUMENTS

DE 3323858 A1 7/1983

(Continued)

*Primary Examiner*—Simon Nguyen
(74) *Attorney, Agent, or Firm*—Lawrence J. Chapa

(57) ABSTRACT

The present invention provides a mechanism (300, 400) and method (500) for rotating at least a first and second housing elements (120, 220) of a device (100) with respect to one another. The first and second housing elements (120, 240) have a common axis of rotation (190), which is substantially perpendicular to a front surface of the device (100). The mechanism (300, 400) includes a wheel (310, 410) having a rounded outer edge (312, 412), which engages a rounded surface (144) of a first housing element (220), which extends at least partly around the axis of rotation (190). The wheel (310, 410) is coupled to the second housing element (120) at a center point (316, 416) about which the wheel (310, 410) is adapted to rotate. The wheel (310, 410) further includes a contact point (318, 418) offset from a center point (316, 416). The mechanism (300, 400) further includes a tension device (320, 420) having a relatively fixed end (324, 424) and a relatively free end (322, 422), which when preloaded, is adapted for supplying a force. The mechanism (300, 400) still further includes a linkage (330, 430) coupled between the free end (322, 422) of the tension device (320, 420) and the offset contact point (318, 418) of the wheel (310, 410) for biasing the wheel (310, 410) toward rotation, and the rotation of the first and second housing elements (120, 220) relative to one another.

39 Claims, 10 Drawing Sheets

U.S. PATENT DOCUMENTS

| | | |
|---|---|---|
| 5,649,309 A | 7/1997 | Wilcox et al. |
| 5,850,612 A | 12/1998 | Kulberg et al. |
| 5,966,776 A | 10/1999 | Ona |
| 6,016,347 A | 1/2000 | Magnasco et al. |
| D424,558 S * | 5/2000 | Hong .................. 455/90.3 |
| D427,172 S * | 6/2000 | Bequir .................. 455/90.3 |
| 6,230,028 B1 | 5/2001 | Shirakawa |
| 6,768,899 B2 * | 7/2004 | Janninck et al. ............ 455/566 |
| 2002/0102946 A1 * | 8/2002 | SanGiovanni ............ 455/90 |

FOREIGN PATENT DOCUMENTS

| | | |
|---|---|---|
| GB | 2 351 201 A | 12/2000 |
| JP | 60-21636 A | 2/1985 |
| JP | 05-211547 | 8/1993 |
| WO | WO 01/15331 A1 | 3/2001 |
| WO | WO 02/33205 A1 | 4/2002 |
| WO | WO 02/082783 A2 | 10/2002 |

* cited by examiner

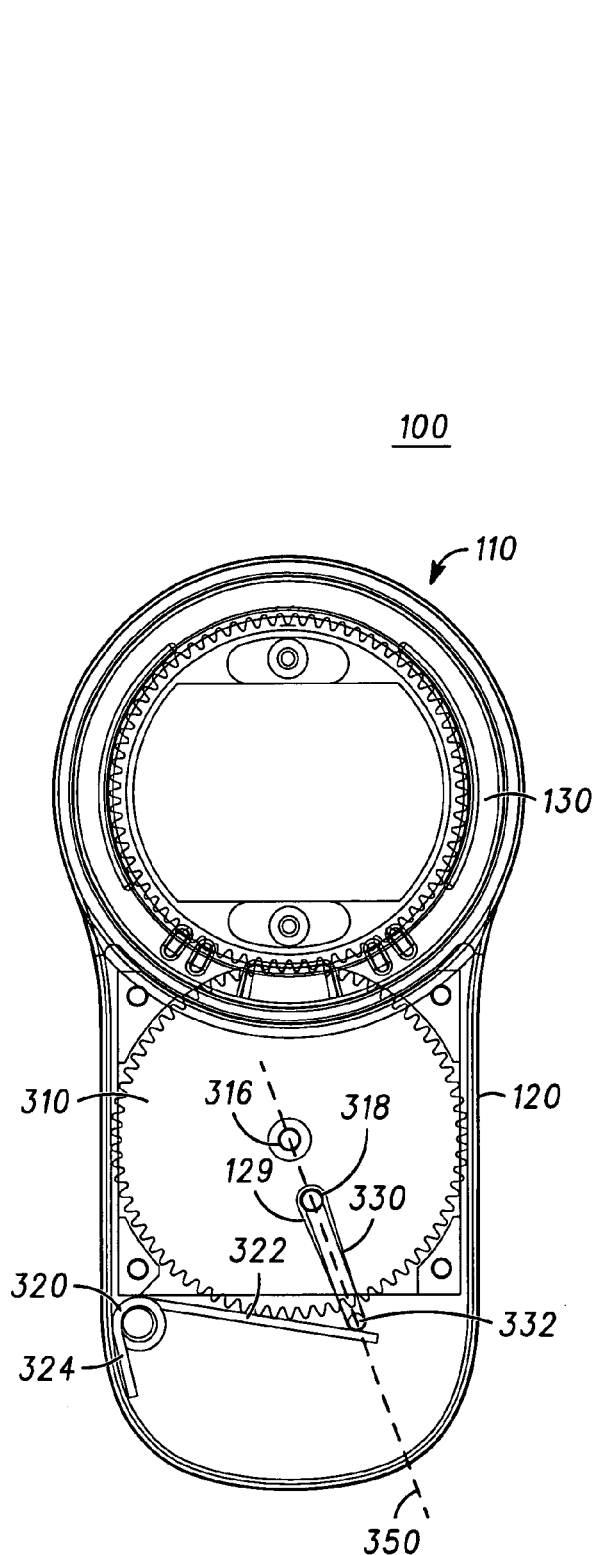
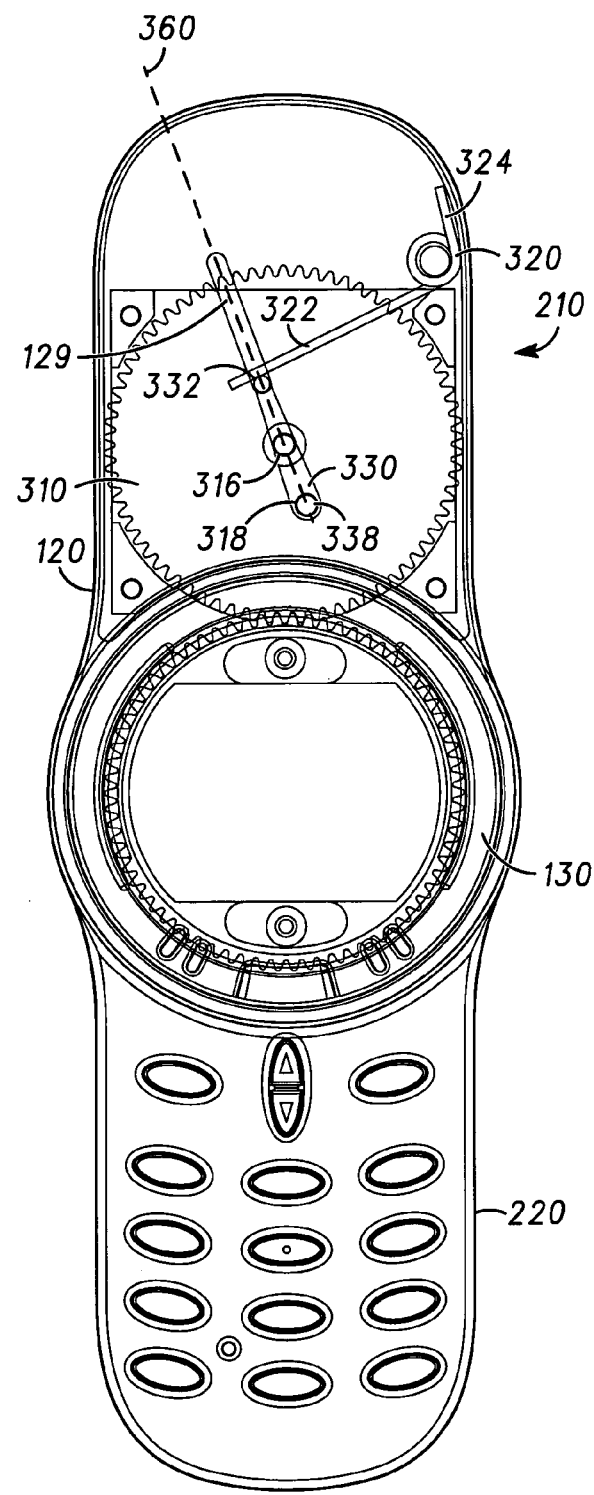
FIG.4     FIG.5

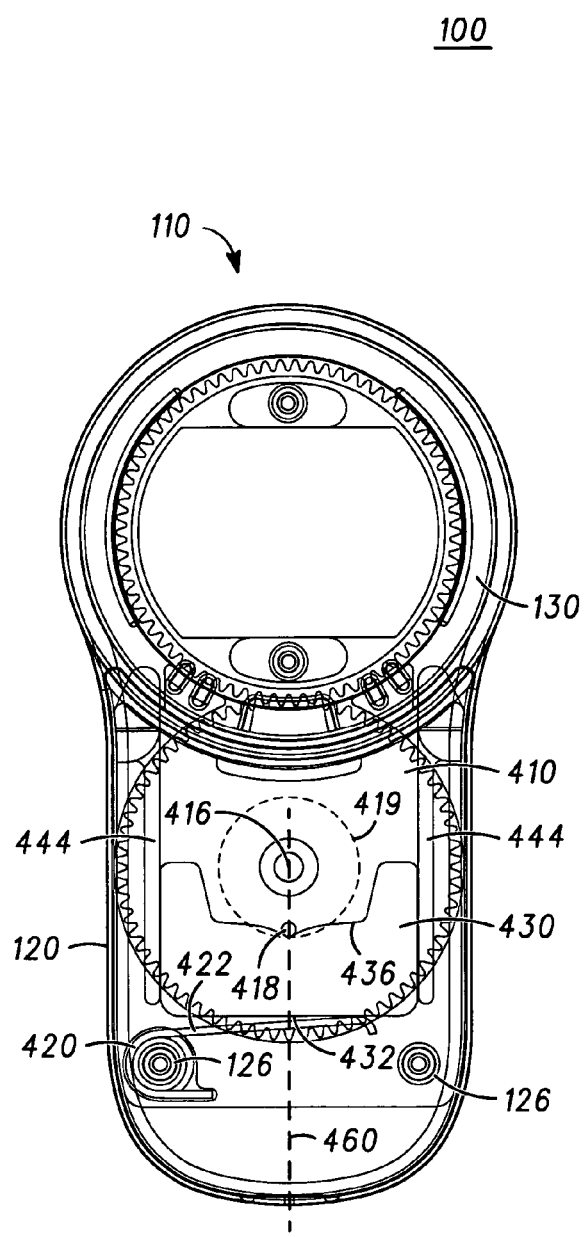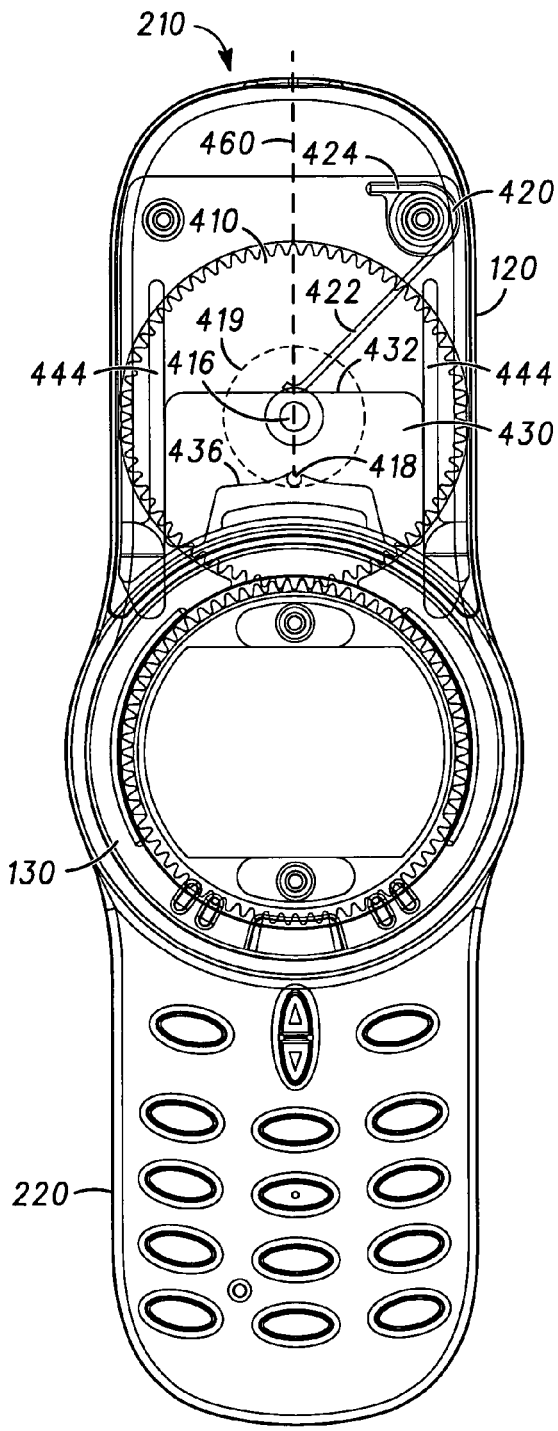
*FIG.8*  *FIG.9*

SELF OPERATING OPENING MECHANISM FOR USE IN A HAND-HELD ELECTRONIC DEVICE

FIELD OF THE INVENTION

The present invention relates generally to the field of portable electronic devices and, more particularly, to a hand-held electronic device having at least a two-part housing which rotates between an opened and a closed position to facilitate usage.

BACKGROUND OF THE INVENTION

Portable electronic devices have many functions and come in a variety of different form factors. For purposes of convenience there is a general trend toward miniaturization of many types of portable electronic devices. Miniaturization generally makes it easier to carry the electronic device on one's self, including fitting the device into one's pocket/purse or attaching the device to one's belt.

While generally there is a motivation to shrink a device's form factor as much as possible, in several specific instances the extent to which the size of a device can be reduced is limited by other countervailing motivations. In some instances, the extent to which the size of a device can be reduced is limited by minimum size requirements that may be necessary for a person to conveniently use and/or interact with the device. For example, a keypad can only shrink so far before it becomes difficult to operate. A keypad generally needs to accommodate the size of the user's hands and/or fingers. Similarly, telephone handsets, which accommodate two-way communication, generally need to accommodate a microphone proximate a user's mouth and a speaker proximate a user's ear.

In order to meet these types of requirements, while otherwise attempting to minimize the devices overall size, many manufacturers have introduced devices having two part housings, which fold with respect to one another, thereby allowing the device to fold open when being used and to fold close when not being used. This allows a device, like a phone, to be more conveniently stored when not being used, and allows the device to expand to a convenient size commensurate with the usage needs.

Previous wireless communication devices have incorporated two part housings, which fold open when being used and fold closed when not being used. One such design includes a flip-type or clam shell design, which generally includes two housing portions coupled together by a hinge at one end of the device. The two parts of the housing rotate with respect to one another along an axis of rotation, which is parallel to the front surface of the device or front facing.

Further, previous wireless communication devices have incorporated a two part housing, which includes two housing portions that rotate with respect to one another around an axis of rotation, which is perpendicular to the front surface of the device. In at least one design, the housing portions can rotate to an open position in either a clockwise direction or a counter-clockwise direction. One such device is disclosed in U.S. application Ser. No. 09/826,180, entitled "Rotational Mechanism for a Wireless Communication Device", filed Apr. 4, 2001, the disclosure of which is incorporated herein by reference.

A large number of these devices being portable in nature are of the type to be used by people away from home or work. In many instances, these individuals will attempt to use the device while performing other activities, where one or both of their hands are generally full or are otherwise engaged. In absence of a self-operating mechanism which accommodates the opening of the two part housing, or in other words, the rotation of the two housing portions with respect to one another, the device generally needs to be opened by separately gripping each housing portion and repositioning/rotating the housing portions, relative to one another. This generally requires that the user free up both hands for opening the device.

For at least flip-type device designs, previous automated opening mechanisms have been developed, which reduce the effort required for opening the device. In some instances the automated opening mechanism enables the device to be opened using a single hand. However, many of these devices incorporate a spring loaded mechanism held closed by a latch. By releasing the latch, the spring action causes the two portions of the housing to rotate with respect to one another into an opened position. Generally one or more physical stops are additionally incorporated to limit the rotational movement of the two parts relative to one another at one or both of the opened and closed positions.

One of the problems associated with using a latch is that latches can wear out or break. Furthermore, the direction of rotation for a mechanism incorporating a latch is often limited to a single direction. Still further, the non-symmetrical shape of the user's hand makes convenient placement of a latch more difficult, if one wants to accommodate both left and right-handed operation.

Consequently, there is a need for a self operating opening mechanism for use in a hand-held portable electronic device, including devices incorporating a two-part housing, where the two parts rotate with respect to one another along an axis of rotation that is substantially perpendicular to the front facing of the device. In addition, the desired mechanism should not compromise the stability and rigidity of the device in the opened and closed positions. It would be further beneficial if the mechanism could be conveniently operated with a single hand using either the right or the left hand, and still further beneficial if the mechanism could facilitate rotation of the two parts relative to one another in each of a clockwise and a counter-clockwise direction.

SUMMARY OF THE INVENTION

The present invention provides a mechanism for rotating at least a first and a second housing element of a device with respect to one another, where the first and second housing elements have a common axis of rotation, which is substantially perpendicular to a front surface of the device. The first housing element has a rounded surface, which extends at least partly around the axis of rotation. The mechanism includes a wheel, a tension device and a linkage.

The wheel has a rounded outer edge for engaging the rounded surface of the first housing element extending at least partly around the axis of rotation. The wheel is coupled to the second housing element at a center point about which the wheel is adapted to rotate. The wheel additionally has a contact point offset from the center point, which as the wheel rotates, rotates about the center point.

The tension device has a relatively fixed end and a relatively free end. When preloaded, the tension device is adapted for supplying a force, through the pressure exerted by the free end relative to the fixed end.

The linkage is coupled between the free end of the tension device and the offset contact point of the wheel. As the force supplied by the tension device is applied to the contact point of the wheel via the linkage, the wheel is biased toward rotation.

In at least one embodiment, the tension device is a torsion spring, the wheel is a toothed gear and the linkage is a slider plate. The slider plate has a contact edge surface for engaging the contact point of the gear, and an opposite edge surface for engaging the free end of the torsion spring. The contact edge surface has a "V"-shaped profile including a point at the base of the "V"-shape and a pair of upraised arms angled at a slope.

In at least a further embodiment, the tension device is a torsion spring, the wheel is a toothed gear and the linkage is a crankshaft. The crankshaft has a first end coupled to the contact point of the gear, and a second end coupled to the free end of the torsion spring. The second end of the crankshaft includes a pin, which is adapted to engage and run along a channel located in the second housing element.

In at least a still further embodiment, the rotation mechanism is incorporated as part of a wireless communication device.

The present invention further provides a method for opening a first and a second housing element of a hand-held device using a self-opening mechanism. More specifically, the method includes manually initiating the rotation of one of the first and second housing elements with respect to the other one of the first and second housing elements along a common axis of rotation, where the axis of rotation is substantially perpendicular to a front surface of the device. The rotation is manually initiated in at least one of a clockwise and a counter-clockwise direction. The rotation of the first and second housing elements is then completed, automatically, between a substantially closed position and a substantially opened position, by a rotation mechanism incorporated as part of the hand-held device.

In at least one of the embodiments, the step of completing the rotation of the first and second housing elements includes a force being applied to a linkage by a preloaded tension device. The force is then transferred along the linkage to an off-center contact point of a wheel, thereby inducing a rotation in the wheel, which is coupled at the center of the wheel to the second housing element. The wheel is then rotated causing the wheel to travel along a curved surface of the first housing element.

In at least a further embodiment, an additional force supplied by a leftover preload of the tension device is applied to the wheel via the linkage after the first and second housing elements have substantially completed their rotation to an open position, for maintaining the first and second housing elements in the predefined rotatably opened position.

These and other object, features, and advantages of this invention are evident from the following description of one or more preferred embodiments of this invention, with reference to the accompanying drawings.

BRIEF DESCRIPTION OF THE DRAWINGS

FIG. 4 is a see through front plan view of the radiotelephone of FIG. 3 in a closed position;

FIG. 5 is a see through front plan view of the radiotelephone of FIG. 3 in an opened position;

FIG. 8 is a see through front plan view of the radiotelephone of FIGS. 6 and 7 in a closed position;

FIG. 9 is a see through front plan view of the radiotelephone of FIGS. 6 and 7 in an opened position;

DETAILED DESCRIPTION OF THE PREFERRED EMBODIMENT(S)

Figure 1:
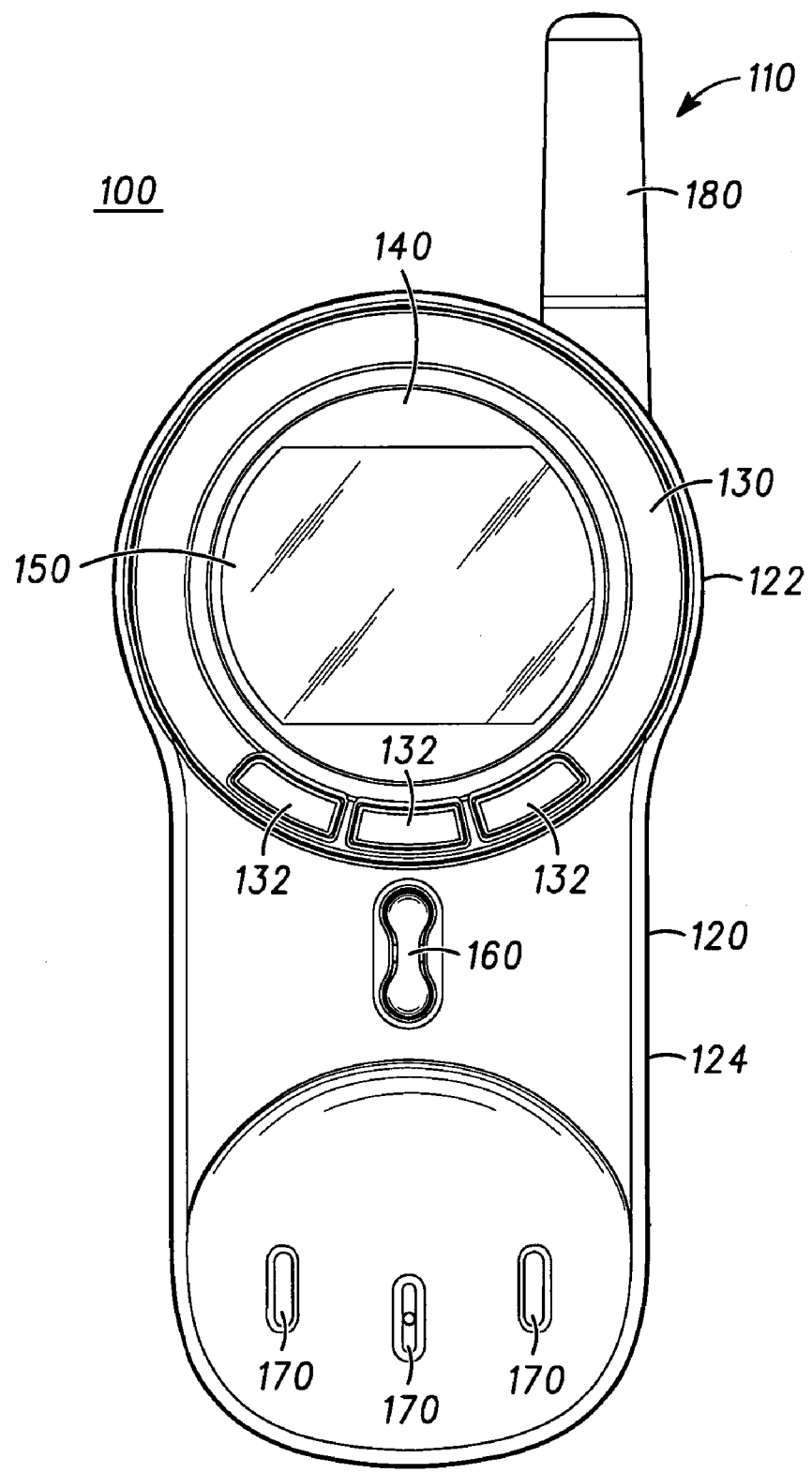
FIG. 1 is a front plan view of a radiotelephone in a closed position.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring to FIG. 1, there is provided a collapsible radiotelephone 100 in a closed position 110. The radiotelephone 100 has wireless communication capabilities and, thus, may be used to communicate with wireless infrastructure, such as cellular base stations, regional and local wireless transponders, and wireless local area networks. The radiotelephone 100 described herein is a representation of the type of wireless communication device that may benefit from the present invention. However, it is to be understood that the present invention may be applied to any type of hand-held or portable electronic device including, but not limited to, the following devices: radiotelephones, cordless phones, paging devices, personal digital assistants, portable computers, pen-based or keyboard-based handheld devices, remote control units, an audio player (such as an MP3 player) and the like. Accordingly, any reference herein to the radiotelephone 100 should also be considered to apply equally to other hand-held or portable electronic devices.

For the preferred embodiment shown in FIG. 1, the radiotelephone 100 has at least two housing elements including an upper housing 120 having a generally elongated and planar shape. The upper housing 120 has an upper circular portion 122 at one end and an upper extending portion 124 extending away from the upper circular portion. In the closed position 110, as illustrated, the upper circular portion 122 and the upper extending portion 124 are rotated so as to be adjacent to similar matching elements corresponding to a lower housing, which are more clearly illustrated in FIG. 2.

The radiotelephone 100 further includes an external antenna 180, which may be provided to enhance the wireless communication capabilities of the radiotelephone 100.

Components of the radiotelephone 100 are positioned near the upper circular portion 122 including an interchangeable cover 130, a locking piece 140, and a display 150. The interchangeable cover 130 has a ring-like shape that may be attached to, and detached from, the radiotelephone 100. The interchangeable cover 130 may include cover selection buttons 132 and/or indicator lights (not shown) to provide additional functionality to the radiotelephone 100. For example, the preferred embodiment provides three cover selection keys 132: a left selection key, and right selection key and a menu key therebetween. The display 150 may be any type of output device that provides a convenient display of text and/or graphics to the user. Preferably, the display 150 is a liquid crystal display having a backlighting system to illuminate the display when lighting conditions are insufficient for proper viewing by the user. The locking piece 140 locks certain components of the radiotelephone 100 together, while simultaneously allowing relative rotational movement of the upper housing with respect to the lower housing. The locking piece 140 also functions as a display lens to protect the display 150 from undesirable, foreign matter.

The extended portion 124 of the upper housing 120 may include upper housing selection buttons 160 and speaker apertures 170. Although many different selection buttons may be provided on the upper housing 120, only one upper housing selection button 160 is shown in FIG. 1 by way of example. In this particular embodiment the selection button is similar to a rocker button having a two-direction "scrolling" function. The upper housing 120 of the present invention may include one or more selection buttons (such as selection buttons 132 and 160) for various types of features including, but not limited to, volume control, menu control, call answering, call termination, caller identification, phone book control, voicemail control, e-mail/messaging control, network browsing, power on/off, and the like. The speaker apertures 170 direct sounds generated by a speaker or other type of audio output device to the user.

In the illustrated embodiment, the upper housing 120 principally functions as a cover, which as noted above can also include some functional electronic components, such as selection buttons 132 and 160, a speaker, or indicator lights. However, in the illustrated embodiment, a majority of the functional electronic components are included as part of the lower housing, which is also referred to as the body.

Figure 2:
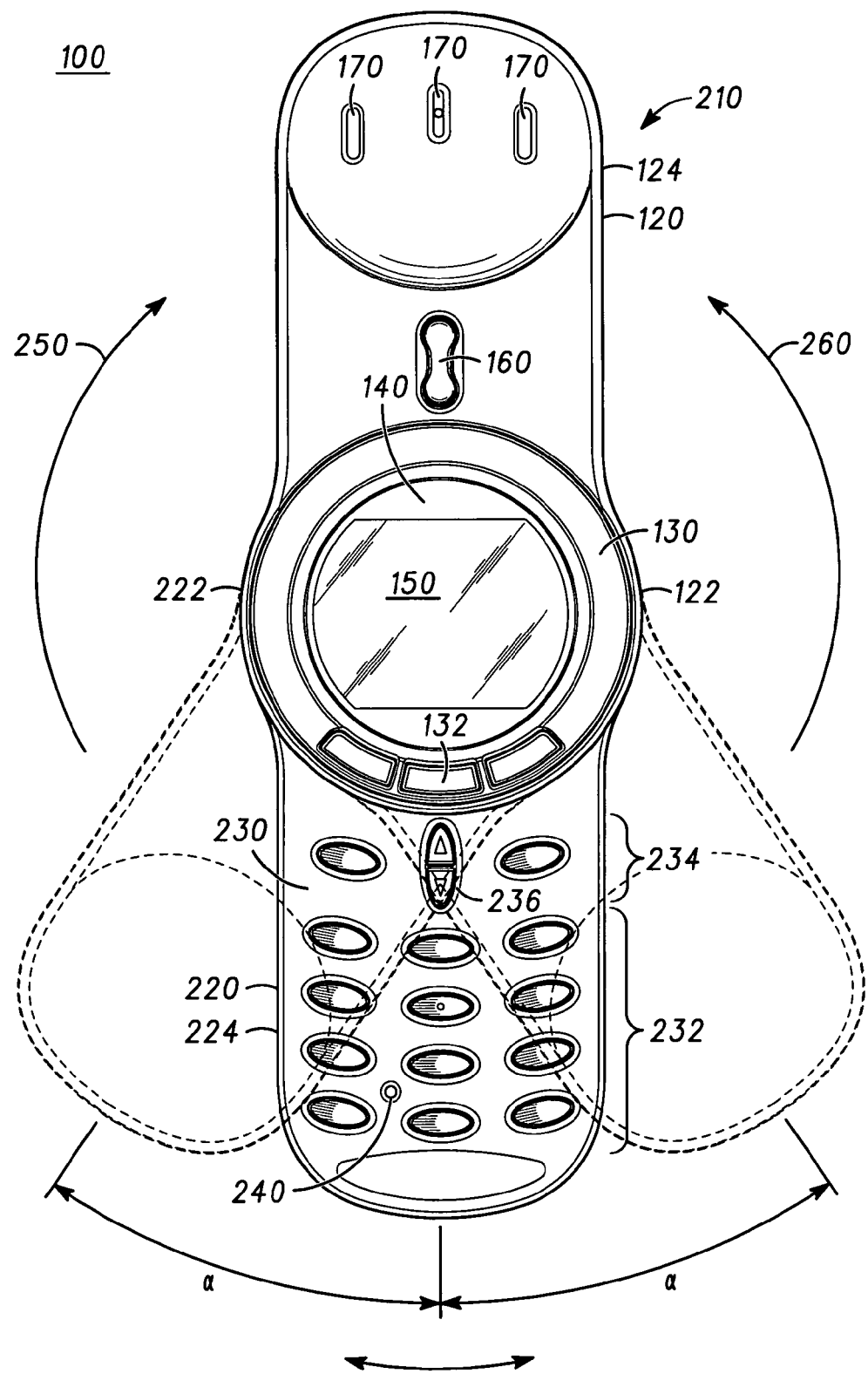
FIG. 2 is a front plan view of the radiotelephone of FIG. 1 in an opened position as well, as two alternative intermediate positions.

Referring to FIG. 2, the preferred embodiment of the radiotelephone 100 is shown in an opened position 210. The portions of the radiotelephone 100 that become visible in the opened position 210 include a lower housing 220, a keypad 230 and a microphone aperture 240. When viewed from the front, the lower housing of the preferred embodiment has a substantially similar profile to the upper housing 120. Correspondingly, the lower housing includes a lower circular portion 222 and a lower extending portion 224. In the opened position 210, the upper circular portion 122 of the upper housing 120 is adjacent to, and positioned above, the lower circular portion of the lower housing 220. On the other hand, the upper extending portion 124 is positioned away from the lower housing. For example, as shown in FIG. 2, the upper extending portion 124 is oriented in an opposite direction to the lower extending portion 124 on opposite sides of the upper and lower circular portions 122 and 222. The keypad 230 may include any layout of keys that provide convenient operation of the radiotelephone 100 by the user.

The microphone aperture 240 directs sounds received from the user or other local sounds to a microphone or other type of audio input device.

The preferred embodiment includes a standard layout of alphanumeric and menu control for operation of the radiotelephone 100. As shown in FIG. 2, the keypad 230 includes twelve standard keys 232 (namely, 0 through 9, # and *) as well as three lower housing selection buttons 234. However, the radiotelephone 100 may include a larger grouping of keys, such as a QWERTY keyboard, if a device having a larger form factor or smaller individual keys is desired. Although not shown in FIG. 2, the keypad 230 may also include a cursor or graphical pointing device such as a joystick, touch pad or track ball. Also, similar to selection buttons 132 and 160 described, above, the lower housing selection buttons 234 may be used for various features including, but not limited to, volume control, menu control, call answering, call termination, caller identification, phone book control, voicemail control, e-mail/messaging control, network browsing, power on/off, and the like.

The preferred embodiment shown in FIG. 2 includes at least two functional positions, namely an opened position 210, and a closed position 110. Generally, the opened position 210 and the closed position 110 activate functions of the radiotelephone 100 such as answering an incoming call and/or initiating a new call, or terminating an existing call. Other relative rotational positions may define alternative functions, and in some cases may select or define functions not specific to radiotelephones. The relative rotational position of the housing may also affect the functionality of, the cover selection buttons 132, upper housing selection button 160, and lower housing selection buttons 234. For example, the selection buttons 132, 160, 234 and 236 may each activate a different function dependent upon the position of the upper housing 120 relative to the lower housing 220.

Figure 3:
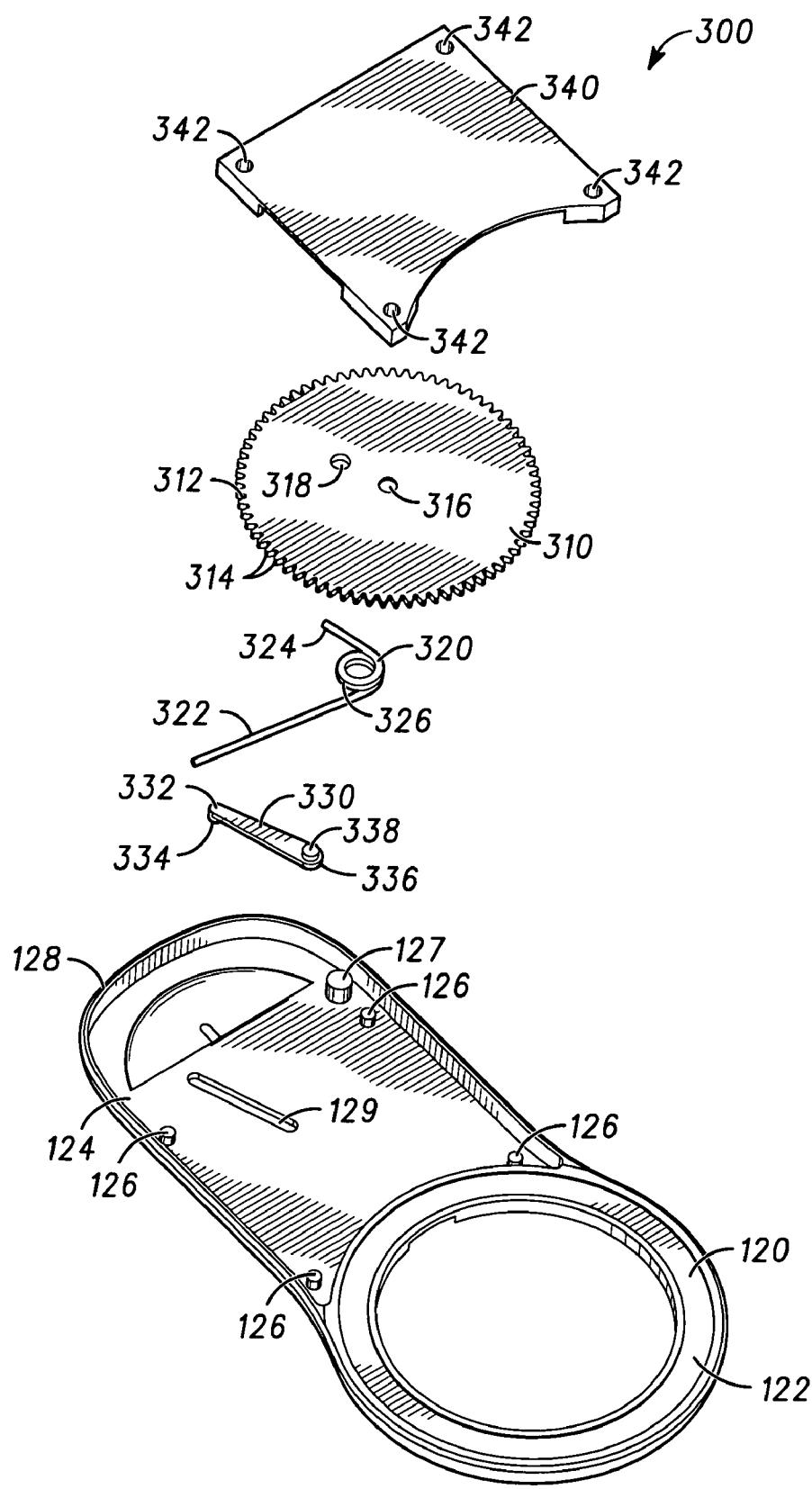
FIG. 3 is an exploded, perspective view of a rotation mechanism in accordance with at least one embodiment of the radiotelephone of FIG. 1 viewed from the back facing.

In order to facilitate movement between an opened position 210 and a closed position 110, the radiotelephone 100 includes a self operating opening mechanism for rotating the upper housing 120 relative to the lower housing 220. FIG. 3 illustrates an exploded, perspective view of at least a portion of an opening mechanism 300 in accordance with at least one embodiment of the radiotelephone 100 of FIG. 1, viewed from a direction consistent with the back side facing of the radiotelephone 100. The opening mechanism 300 includes a wheel 310, a tension device 320, and a linkage 330. In the illustrated embodiment, the opening mechanism 300 additionally includes a retainer plate 340.

The retainer plate 340 couples to the upper housing 120 via four posts 126 extending from the interior surface of the upper housing 120. The four posts 126 are each received in a corresponding one of four holes 342 located in the retainer plate 340. When coupled together, the retainer plate 340 and the upper housing 120 form a space therebetween within which the wheel 310, the tension device 320, and the linkage 330 are received.

In the illustrated embodiment, the wheel 310 is a gear having a rounded outer edge 312 including gear teeth 314. The gear teeth are adapted to engage corresponding gear teeth located along a curved surface of the lower housing 220, which extends at least partly around the axis of rotation. In the embodiment illustrated in FIG. 6, the corresponding gear teeth 142 on the lower housing 220 are formed as part of the locking piece 140.

The wheel 310 is rotatably coupled to the upper housing 120, via a protrusion (not shown), which extends downward from the retainer plate 340. The protrusion engages a hole 316 located at the center point of the wheel 310, about which the wheel 310 is adapted to rotate. The wheel 310 further includes a contact point 318, which is offset from the center point.

In the embodiment illustrated in FIG. 3, the tension device 320 is a torsion spring. The torsion spring has a relatively free end 322 and a relatively fixed end 324 coupled together via a spring coil 326. The spring coil 326 comprises one or more coiled loops, which rest upon a post 127 extending from the upper housing 120. When the spring coil 326 is coupled to the post 127, the relatively fixed end 324 is oriented so as to rest against a wall 128, which extends from the outer edge of the upper housing 120.

The relatively free end 322 of the tension device 320 engages a first end 332 of a linkage 330, which has a protrusion 334 that rests within a slot 129 formed along the internal surface of the upper housing 120. The linkage 330 has a second protrusion 336 located at a second end 338 of the linkage 330, that engages the contact point 318 of the wheel 310. In the embodiment illustrated in FIG. 3, the linkage 330 is a crankshaft.

FIGS. 4 and 5 illustrate a see through front plan view of the radiotelephone 100 of FIG. 3 in both a closed position 110 (FIG. 4) and an opened position 210 (FIG. 5). In the closed position 110, the preceding compression or preloading of the tension device 320 results in a force being applied to the first end 332 of the linkage 330, which is located at a first end of the slot 129. In the closed position 110, both the first end 332 and the second end 338 of the linkage 330 are in line 350 with the center point 316 of the wheel 310, which results in the force exerted on the wheel 310 by the tension device 320, via the linkage 330, being similarly directed toward the center point 316 of the wheel 310. In effect, the force being applied is directly perpendicular to the permissible direction of movement of the contact point 318 relative to the rotation of the wheel 310, and therefore does not serve to generate any rotational movement of the wheel 310.

It is only after the upper housing 120 or cover of the radiotelephone 100 is initially manually rotated in either a clockwise 250 or a counter-clockwise 260 direction, and the contact point 318 of the wheel 310 is no longer in line with the end points 332 and 338 of the linkage 330 and the center 316 of the wheel 310 and/or the further rotational movement of the wheel 310 does not require further compression of the tension device 320, that the force applied to the wheel 310 at the contact point 318 by the tension device 320 includes a vector component in a permissible direction of travel of the contact point 318, which serves to generate rotational movement of the wheel 310 and consequently the upper housing 120.

After the upper housing 120 is rotated an amount such that further rotation of the upper housing does not require further compression of the tension device 320, the force applied by the tension device 320 serves to complete the rotation of the upper housing 120 to an opened position 210. As the rotation of the upper housing 120 approaches an opened position 210, the contact point 318 of the wheel 310 in contact with the second end 338 of the linkage 330 is once again in line 360 with the center 316 of the wheel 310 and the first end 332 of the linkage 330. The protrusion 334 at the first end 332 of the linkage 330 additionally reaches the end of the slot 129 in the inside surface of the upper housing 120. Any further rotation of the wheel 310 would require that the tension device 320 begin to compress against a preloaded force, which continues to exert a force toward the further expansion of the tension device 320.

The continued force applied by the tension device 320 maintains the housing in the opened position 210, if or until a larger external countervailing closing force is applied. In order to close the device, typically, a user will physically rotate the two housing portions 120 and 220 relative to one another against the exerted force of the tension device 320. During the closing of the device 100, the compression of the tension device 320 serves to further preload the tension device 320, which in turn provides the necessary opening force during the subsequent opening of the device 100.

Figure 6:
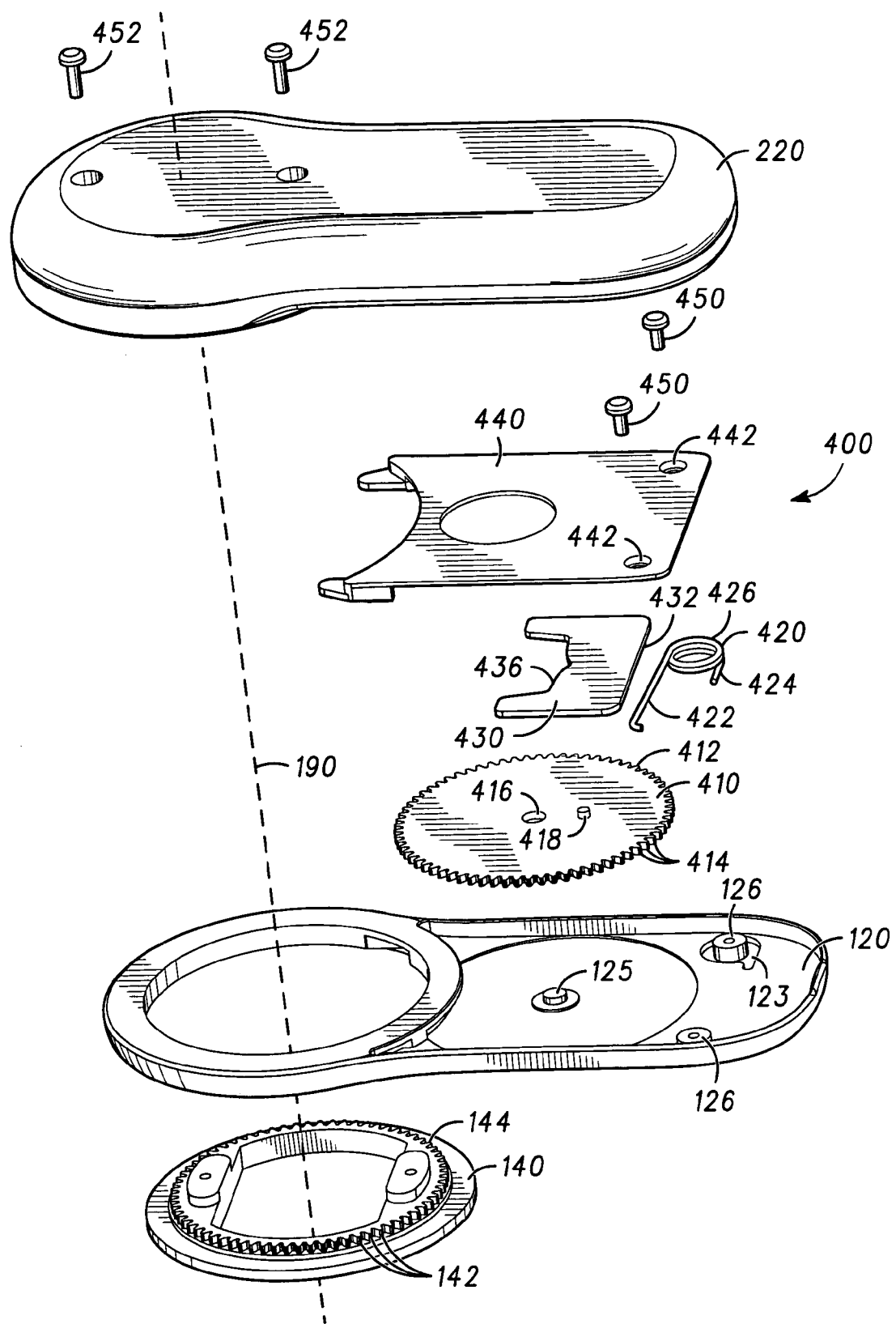
FIG. 6 is an exploded, perspective view of a radiotelephone including a rotation mechanism in accordance with at least one of a further embodiment of the radiotelephone of FIG. 1 viewed from the back facing.
Figure 7:
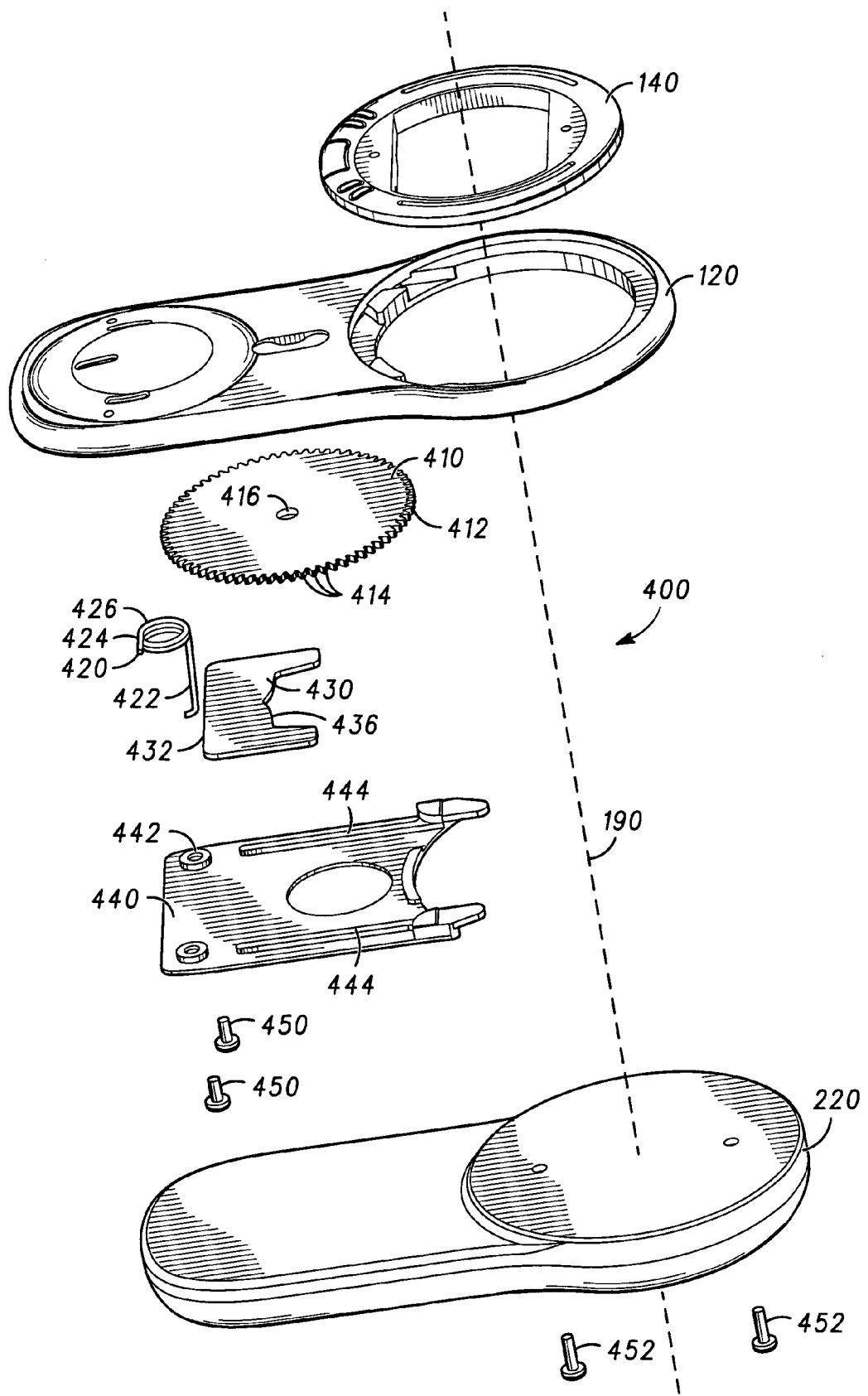
FIG. 7 is an exploded, perspective view of a radiotelephone including a rotation mechanism in accordance with at least one of a further embodiment of the radiotelephone of FIG. 1 viewed from the front facing.

FIGS. 6 and 7 illustrate an exploded, perspective view of at least a portion of an opening mechanism 400 in accordance with at least a further embodiment of the radiotelephone of FIG. 1. FIG. 6 illustrates an exploded, perspective view viewed from a direction consistent with the back side facing of the radiotelephone 100. FIG. 7 illustrates an exploded, perspective view viewed from a direction consistent with the front side facing of the radiotelephone 100.

Similar to the embodiment of the opening mechanism 300 illustrated in FIGS. 3–5, the opening mechanism 400, illustrated in FIGS. 6 and 7, includes a wheel 410, a tension device 420, and a linkage 430. The opening mechanism 400 additionally includes a retainer plate 440.

The retainer plate 440 is coupled to the upper housing 120 via a pair of posts 126 extending from the interior surface of the upper housing 120. The posts 126 are each aligned with a corresponding one of two holes 442 located in the retainer plate 440. A fastener 450, like a screw, is received through each of the holes 442, and into a corresponding aligned hole in one of the posts 126. When coupled together, the retainer plate 440 and the upper housing 120 form a space therebetween within which the wheel 410, the tension device 420, and the linkage 430 are received. The retainer plate 440 additionally includes a pair of rails 444 (FIG. 7) along which the linkage 430 travels.

In the further illustrated embodiment 400, the wheel 410 is a gear having a rounded outer edge 412 including gear teeth 414. The gear teeth 414 are adapted to engage corresponding gear teeth 142 located along a curved surface 144 of the lower housing 220, which extends at least partly around the axis of rotation 190. The corresponding gear teeth 142 on the lower housing 220 are formed as part of the locking piece 140. The locking piece 140 is attached to the lower housing 220 via a pair of fasteners 452.

The wheel 410 is rotatably coupled to the upper housing 220, via a protrusion 125, which extends from the interior surface of the upper housing 220. The protrusion engages a hole 416 located at the center point of the wheel 410, about which the wheel 410 is adapted to rotate. The wheel 410 further includes a contact point 418, which, in the present embodiment, corresponds to a protrusion that is offset from the center point.

In the embodiment illustrated in FIGS. 6 and 7, similar to the embodiment illustrated in FIG. 3, the tension device 420 is a torsion spring. The torsion spring has a relatively free end 422 and a relatively fixed end 424 coupled together via a spring coil 426. The spring coil 426 comprises one or more coiled loops, which rest upon one of the posts 126 used in connection with coupling the retainer plate 440 to the upper housing 120. When the spring coil 426 is coupled to the post 126, the relatively fixed end 424 is captivated within a depression 123 formed in the inner surface of the upper housing, instead of resting against a wall 128, which extends from the outer edge of the upper housing 120. The depression is contoured to correspond to the bottom surface of the torsion spring.

The relatively free end 422 of the tension device 420 engages a first end of the linkage 430, corresponding to a back edge surface 432 of a slider plate. The linkage 430 has a contact edge surface 436 located at a second end of the slider plate, that engages the contact point 418 of the wheel 410. In the illustrated embodiment, the back edge surface 432 is opposite to the contact edge surface 436.

Figure 10:
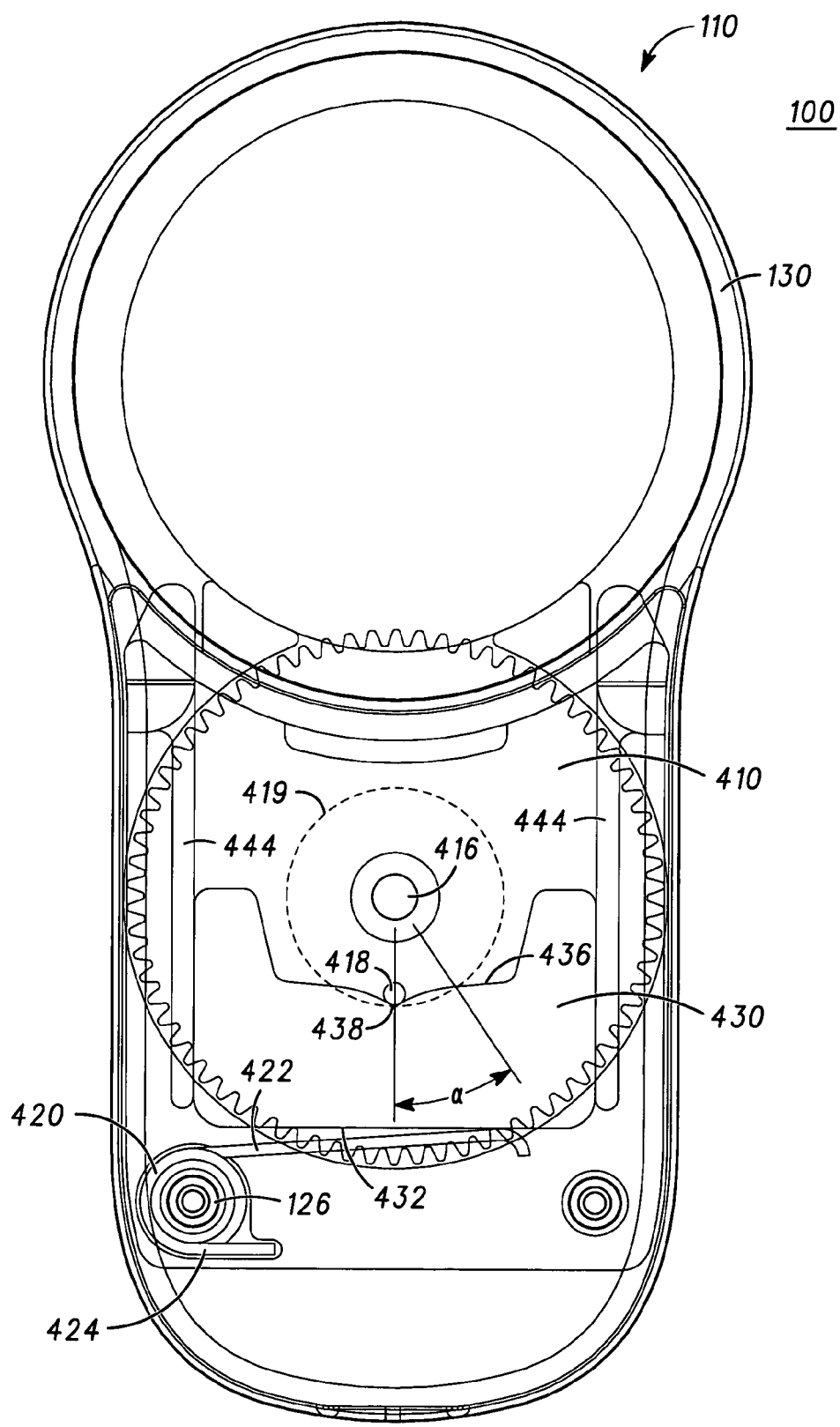
FIG. 10 is an enlarged partial see through plan view illustrating the rotation mechanism of FIGS. 6 and 7, in a closed position.
Figure 11:
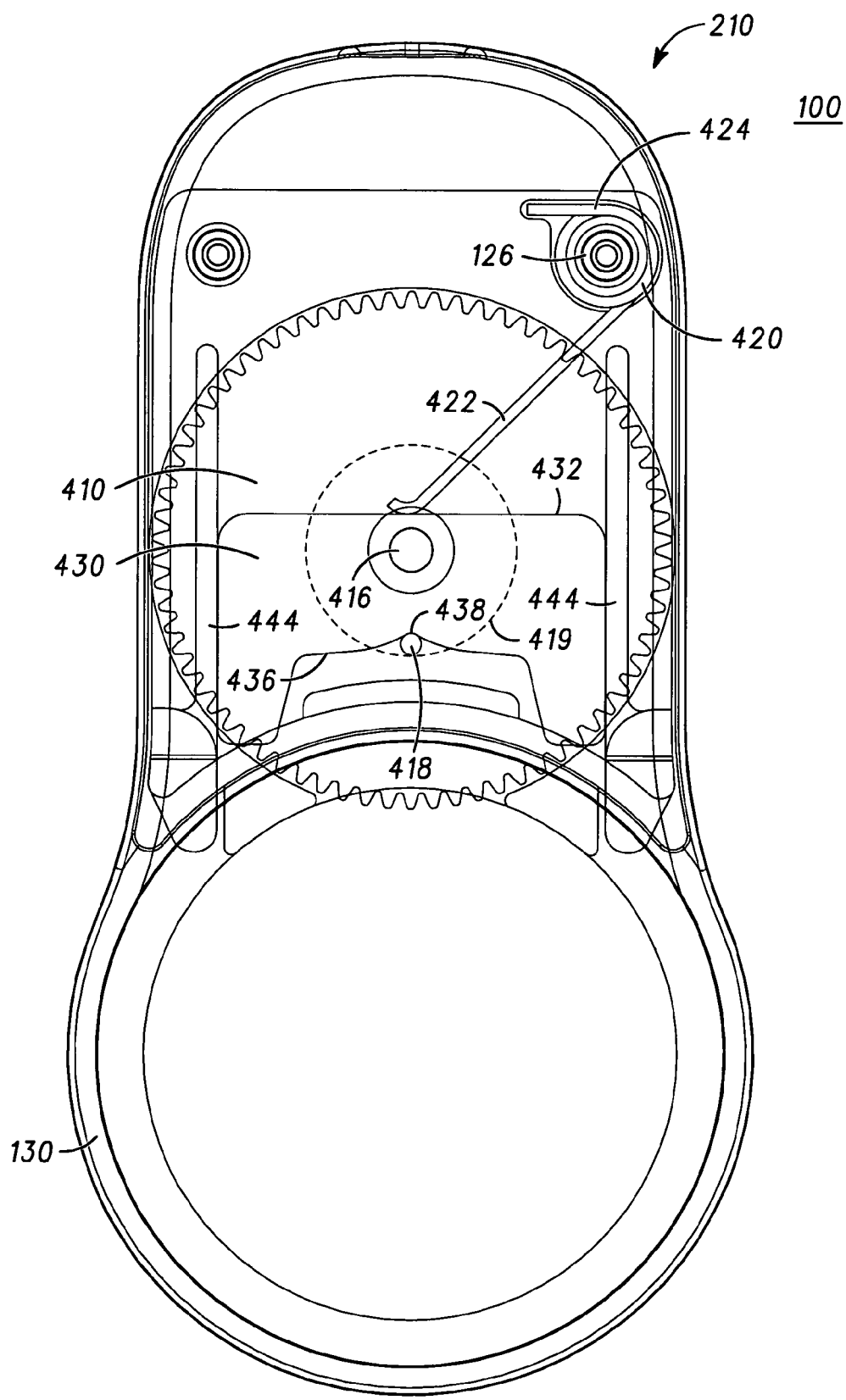
FIG. 11 is an enlarged partial see through plan view illustrating the rotation mechanism of FIGS. 6 and 7, in an opened position.

FIGS. 8 and 9 illustrate a see through front plan view of the radiotelephone 100 of FIGS. 6 and 7 in each of a closed position 110 (FIG. 8) and an opened position 210 (FIG. 9). FIGS. 10 and 11 illustrate enlarged see through front plan views of the upper housing portion of the radiotelephone 100, as shown in FIGS. 8 and 9, corresponding to each of the opened and closed positions.

Similar to the embodiment illustrated in FIGS. 3–5, the embodiment illustrated in FIGS. 6–11 will complete the opening (i.e. rotation) of the two housing portions of the radiotelephone 100, relative to one another, after the rotation of the two housing portions has been manually initiated. Additionally, both embodiments similarly will maintain a fully opened and a fully closed position, with the tension device continuing to exert a force upon the linkage.

Maintenance of a fully opened 210 and a fully closed 110 position results from the geometries of the interacting elements of the opening mechanism 400 being selected so as to require the further compression, at least momentarily, of the already partially preloaded or compressed tension device 420 in order to facilitate initial rotation of the wheel 410 and consequently rotation of the upper housing 120. In the embodiment illustrated in FIGS. 6–11, this is largely accomplished by using a linkage 430 or slider plate having a "V"-shaped contact edge surface, where the upwardly extending arms of the "V"-shaped contact edge surface are angled at a slope, which is greater proximate the base 438 of the "V"-shaped profile. The slope of the upwardly extending arms can also be used to adjust the rate of rotation of the two parts, while the housing portions of the radiotelephone 100 move between a closed and an opened position.

Similar to the combination of the tension device 320 and the crankshaft 330 of the embodiment illustrated in FIGS. 3–5, the combination of the tension device 420 and the slider plate 430, illustrated in FIGS. 6–11, provides a force to the off center contact point 418 of the wheel 410, which generally biases the housing portions 120 and 220 toward an opened position. However the greater slope of the upwardly extending arms or dip at the base 438 of the "V"-shaped profile of the contact edge surface 436 of the slider plate 430 causes the combination of the tension device 420 and the slider plate 430 to be initially biased toward the fully closed position. This is because in order for the contact point 418 of the wheel 410 to rotate away from the fully closed position, the tension device 420 is required to initially further compress.

In FIGS. 8–11, a path 419 of the off center contact point 418 of the wheel 410 is illustrated. In the closed position 110, the portion of the contact edge surface 436 immediately adjacent the base of the "V"-shaped profile extends inside of the circular path 419 of the contact point 418. The contact edge surface 436 extends inside the circular path 419 until the wheel 410 rotates an amount proximate to an angle α, illustrated in FIGS. 2 and 10. In FIG. 10, it can be seen that the angle α corresponds to the point where the path of the contact point of the wheel coincides with the contact edge surface, and the degree of compression of the tension device 420 coincides with the compression of the tension device when the radiotelephone 100 is in a closed position 110.

In reality, however, the rotation mechanism 400 will automatically complete the rotation of the housing portions 120 and 220 of the radiotelephone 100 to an open position 210 after the slope of the path 419 of the contact point 418 exceeds the slope of the of the contact edge surface 436 of the slider plate 430. In the illustrated embodiment, the slope of the path 419 of the contact point 418 will exceed the slope of the contact edge surface 436 at an angle less than α. In the illustrated embodiment α is approximately 35°, and more precisely 34.2°. At this point, the force being exerted upon the contact point 418 by the tension device 420, via the linkage 430 will cause a relative movement of the contact point 418 in a direction consistent with the exerted force and the further rotation of the wheel 410.

In addition to requiring a further compression of the tension device 420 to initially rotate the upper and lower housing 120 and 220 away from the fully closed and opened positions 110 and 210, in the fully closed and opened position the contact point 418 of the wheel 410 is in line 460 with the center 416 of the wheel 410, as well as the point of contact of the linkage 430 at the base 438 of the "V"-shaped profile, such that the force applied by the tension device 420 via the linkage 430 is perpendicular to the permissible direction of movement of the contact point 418 relative to the rotation of the wheel 410. Consequently, the force applied to the contact point 418 by the tension device 420 does not serve to generate any rotational movement of the wheel 410.

The rotation can be initiated in either a clockwise or a counter-clockwise direction. Furthermore the rotation can, generally, be initiated using a single hand, where one example includes holding the radiotelephone 100 from the back side in the palm of a user's hand and rotating the cover with the user's thumb, which extends around the side and toward the front side of the radiotelephone 100.

Furthermore, because the degree of compression of the spring is dependent upon the absolute position of the housing portions relative to one another, and is not dependent upon the overall amount or the direction of the motion, there is no restriction on the number of times the upper housing 120 or cover can be rotated in the same direction (the closing operation, regardless of direction, always reloads the spring).

While both of the illustrated embodiments have used a torsion spring 320, 420 coupled to a contact point 318, 418, via a linkage 330, 430, it will be readily clear to one skilled in the art that other types of tension devices could be used. Furthermore the manner in which the tension device applies a force to the wheel could similarly involve alternative approaches. For example, a spring loaded pulley might be used to supply the necessary force, which might allow for greater flexibility in the placement of the tension device. However, some of the alternative approaches might not be as flexible in terms of the direction of rotation, or the number of times the upper housing 120 or cover can be rotated in the same direction.

Still further, while the self operating opening mechanisms, in the preferred embodiments, described herein, have been described as being largely contained within the upper housing 120 or the cover of the radiotelephone 100, portions of the opening mechanism 300, 400 could alternatively be located in the lower housing 220, or body of the radiotelephone 100, without departing from the scope of the present invention.

Figure 12:
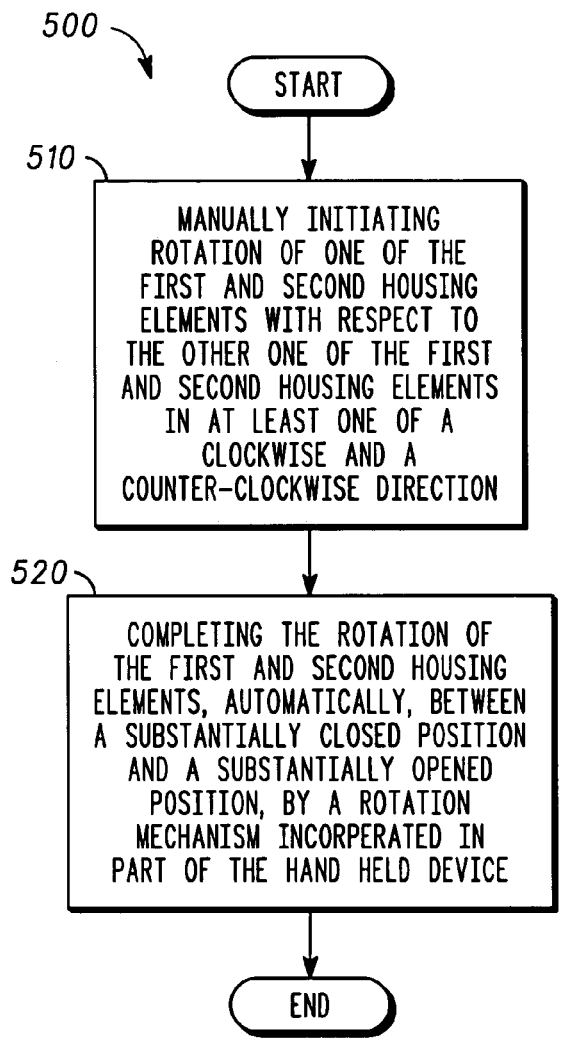
FIG. 12 is a flow diagram of a method for opening a first and a second housing element of a hand-held device using a self-opening mechanism, in accordance with at least one embodiment of the present invention.
Figure 13:
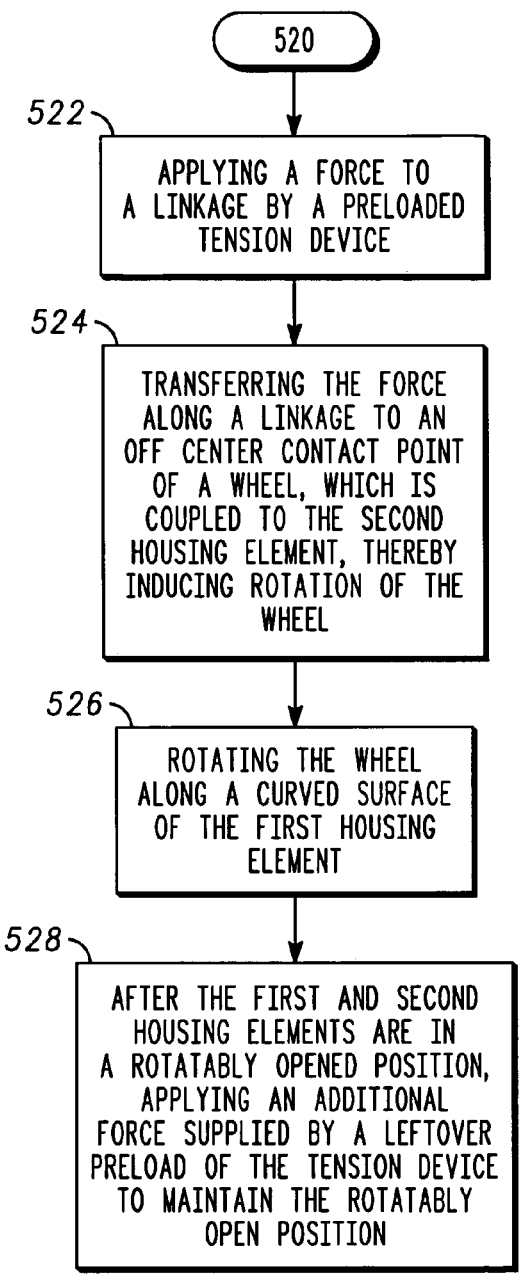
FIG. 13 is a more detailed flow diagram for completing the rotation of the first and second housing elements.

FIGS. 12 and 13 illustrate a method 500 of opening a first and a second housing element of a hand-held device using a self operating opening mechanism, consistent with at least the preferred embodiments of the present invention. Generally, as illustrated in FIG. 12, the method 500 includes manually initiating the rotation of one of the first and second housing elements with respect to the other one of the first and second housing elements (i.e. upper and lower) in at least one of a clockwise and a counter-clockwise direction 510. The method further includes completing the rotation 520 of the first and second housing elements, automatically, between a substantially closed position and a substantially opened position, by a rotation mechanism incorporated as part of the hand-held device. In at least the preferred embodiments, the opening of the phone can be completed in either a clockwise or a counter-clockwise direction. Typically, the rotation of the first and second housing elements is completed in the same direction that the rotation is manually initiated.

FIG. 13 illustrates a more detailed flow diagram for completing the rotation of the first and second housing elements. The more detailed description of completing the rotation of the first and second housing elements 520 includes applying a force 522 to a linkage by a preloaded tension device. The force is then transferred 524 along the linkage to an off center contact point of a wheel, which is coupled to the second housing element 524. The force, which is applied to the off center contact point, induces a rotation of the wheel. The wheel is then rotated 526 along a curved surface of the first housing element, which generally extends at least partially around the common access of rotation. After the first and second housing elements are in a rotatably opened position, an additional force is applied to the contact point by a leftover preload stored in the tension device 528 to maintain the rotatably opened position.

Generally, in the preferred embodiment, the opened and closed position differ from one another by approximately 180°. However in some instances, the difference can be more or less. For example, in some instances a difference less than 180° might allow the radiotelephone to follow more closely the contour of a user's face, where one end of the opened phone, which produces an audio output, is proximate to the user's ear, and where the other end of the opened phone, which receives an audio input, is proximate the user's mouth.

The method additionally provides for the first and second housing elements to be returned to a non-rotated position. In at least some instances, this requires the manual application of a force by the user, which counteracts the force produced by the tension device. In at least one embodiment, returning the first and second housing element to a non-rotated position serves to preload the tension device.

While the above described self operating opening mechanism for use in a hand-held electronic device is completely mechanical, alternative approaches could introduce electromechanical elements such as motors or linear actuators without departing from the scope of the present invention. However, one of the advantages to an all mechanical approach is that the all mechanical opening mechanism will not need to draw energy from a self contained power source, like a battery, when the mechanism is being used to open or close the device. This allows more of the energy stored in the power source to be used for the other operations of the device, such as the transmission and reception of a wireless signal.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A mechanism for rotating at least a first and a second housing element of a device with respect to one another, where the first and second housing elements have a common axis of rotation, which is substantially perpendicular to a front surface of the device, the first housing element having a rounded surface which extends at least partly around said axis of rotation, said mechanism comprising:
   a wheel having a rounded outer edge for engaging the rounded surface of said first housing element, said wheel being coupled to said second housing element at a center point about which the wheel is adapted to rotate, and for traveling around the rounded surface of the first housing element along with the corresponding center point as the wheel rotates, said wheel additionally having a contact point offset from said center point;
   a tension device having a relatively fixed end and a relatively free end with respect to said second housing element, said tension device being adapted for supplying a force when said tension device is preloaded; and
   a linkage coupled between the free end of the tension device and the offset contact point of the wheel for biasing the wheel toward rotation.

2. A mechanism in accordance with claim 1 wherein said tension device includes a spring.

3. A mechanism in accordance with claim 2 wherein said spring is a torsion spring.

4. A mechanism in accordance with claim 1 wherein said linkage is a slider plate having a contact edge surface for engaging the contact point of said wheel, and an opposite edge surface for engaging the free end of said tension device.

5. A mechanism in accordance with claim 4 wherein said contact edge surface has a "V"-shaped profile including a point at the base of the "V"-shape and a pair of upraised arms angled at a slope.

6. A mechanism in accordance with claim 5 wherein the contact point of said wheel is biased toward a rotationally stopped position at the point at the base of the "V"-shaped profile.

7. A mechanism in accordance with claim 6 wherein the angled slope of at least one of the pair of upraised arms of the "V"-shaped profile increases near the point at the base of the "V"-shape.

8. A mechanism in accordance with claim 1 wherein said linkage is a crankshaft having a first end coupled to the contact point of said wheel, and a second end coupled to the free end of said tension device.

9. A mechanism in accordance with claim 8 wherein said second end of said crankshaft includes a pin which is adapted to engage and run along a channel located in said second housing.

10. A mechanism in accordance with claim 1 wherein said wheel is a flat gear.

11. A mechanism in accordance with claim 10 wherein said rounded outer edge of said flat gear includes teeth, which are adapted to engage corresponding teeth located along the rounded surface of said first housing element.

12. A mechanism in accordance with claim 1 wherein said device is a hand-held device.

13. A mechanism in accordance with claim 1 wherein said device is an electronic device.

14. A mechanism in accordance with claim 13 wherein said electronic device is a wireless communication device.

15. A method of opening a first and a second housing element of a hand-held device using a self-opening mechanism comprising:
  manually initiating rotation of one of the first and second housing elements with respect to the other one of the first and second housing elements along a common axis of rotation, which is substantially perpendicular to a front surface of the device, in at least one of a clockwise and a counter-clockwise direction;
  completing the rotation of the first and second housing elements, automatically, between a substantially closed position and a substantially opened position, by a rotation mechanism incorporated as part of the hand-held device.

16. A method in accordance with claim 15, wherein completing the rotation of the first and second housing elements includes rotating the first and second housing elements substantially one hundred and eighty degrees with respect to one another from the position of the two housing elements prior to manually initiating rotation.

17. A method in accordance with claim 15, wherein completing the rotation of the first and second housing elements includes:
  applying a force to a linkage by a preloaded tension device;
  transferring the force along the linkage to an off-center contact point of a wheel, which is coupled to the second housing element, thereby inducing a rotation in the wheel;
  rotating the wheel, along a curved surface of the first housing element.

18. A method in accordance with claim 17, wherein completing the rotation of the first and second housing elements further includes applying an additional force supplied by a leftover preload of the tension device for maintaining the first and second housing elements in a rotatably opened position.

19. A method in accordance with claim 15, wherein the device is capable of opening in both a clockwise and a counter-clockwise direction, and when the rotation is manually initiated in either a clockwise or a counter-clockwise direction, the rotation is completed in the same direction that the rotation was manually initiated.

20. A method in accordance with claim 15, further comprising returning the first and second housing elements to a non-rotated position, wherein returning to a non-rotated position results in the preloading of a tension device.

21. A method in accordance with claim 20, wherein the first and second housing elements are manually returned to a non-rotated position in a direction counter to the direction of rotation during the opening of the first and second housing elements.

22. A device comprising:
  a first housing element;
  a second housing element; and
  a self-opening mechanism coupled to said first housing element and said second housing element for rotating the first and second housing elements with respect to one another along a common axis of rotation, which is substantially perpendicular to a front surface of the device, between a substantially closed position and a substantially opened position.

23. A device in accordance with claim 22, wherein said device is a wireless communication device.

24. A device in accordance with claim 23, wherein said first housing element is a body including electronic components and said second housing element is a cover.

25. A device in accordance with claim 24, wherein said body includes a keypad.

26. A device in accordance with claim 24, wherein said body includes a microphone and said cover includes a speaker.

27. A device in accordance with claim 22, wherein said first housing element has a rounded surface, which extends at least partly around said common axis of rotation, and wherein said self-operating mechanism for rotating the first and second housing elements includes;
  a wheel having a rounded outer edge for engaging the rounded surface of said first housing element, said wheel being coupled to said second housing element at a center point about which the wheel is adapted to rotate, and for traveling around the rounded surface of the first housing element along with the corresponding center point as the wheel rotates, said wheel additionally having a contact point offset from said center point,
  a tension device having a relatively fixed end and a relatively free end with respect to said second housing element, said tension device being adapted for supplying a force when said tension device is preloaded, and
  a linkage coupled between the free end of the tension device and the offset contact point of the wheel for biasing the wheel toward rotation.

28. A device in accordance with claim 27, wherein said device further includes a retainer plate coupled to said second housing element for forming a space therebetween within which the wheel, the tension device and the linkage is located.

29. A device in accordance with claim 27 wherein said tension device includes a spring.

30. A device in accordance with claim 29 wherein said spring is a torsion spring.

31. A device in accordance with claim 27 wherein said linkage is a slider plate having a contact edge surface for engaging the contact point of said wheel, and an opposite edge surface for engaging the free end of said tension device.

32. A device in accordance with claim 31 wherein said contact edge surface has a "V"-shaped profile including a point at the base of the "V"-shape and a pair of upraised arms angled at a slope.

33. A device in accordance with claim 32 wherein the contact point of said wheel is biased toward a rotationally stopped position at the point at the base of the "V"-shaped profile.

34. A device in accordance with claim 33 wherein the angled slope of at least one of the pair of upraised arms of the "V"-shaped profile increases near the point at the base of the "V"-shape.

35. A device in accordance with claim 27 wherein said linkage is a crankshaft having a first end coupled to the contact point of said wheel, and a second end coupled to the free end of said tension device.

36. A device in accordance with claim 35 wherein said second end of said crankshaft includes a pin which is adapted to engage and run along a channel located in said second housing.

37. A device in accordance with claim 35 wherein said device further includes a retainer plate coupled to said second housing element for forming a space therebetween within which the wheel, the tension device and the crank shaft is located, and wherein said second end of said crank shaft includes a pin which is adapted to engage and run along a channel formed as part of said retainer plate.

38. A device in accordance with claim 27 wherein said wheel is a flat gear.

39. A device in accordance with claim 38 wherein said rounded outer edge of said flat gear includes teeth, which are adapted to engage corresponding teeth located along the rounded surface of said first housing element.

* * * * *